United States Patent
Lau et al.

(10) Patent No.: US 7,519,527 B2
(45) Date of Patent: Apr. 14, 2009

(54) METHOD FOR A DATABASE WORKLOAD SIMULATOR

(75) Inventors: Tsz-Kin Lau, Richmond Hill (CA); Peter Kin Leung Shum, Toronto (CA)

(73) Assignee: International Business Machines Corporation, Armonk, NY (US)

(*) Notice: Subject to any disclaimer, the term of this patent is extended or adjusted under 35 U.S.C. 154(b) by 323 days.

(21) Appl. No.: 11/262,573

(22) Filed: Oct. 31, 2005

(65) Prior Publication Data

US 2007/0112549 A1    May 17, 2007

(51) Int. Cl.
*G06F 9/44* (2006.01)

(52) U.S. Cl. .................. 703/21; 702/182; 702/186; 703/22; 703/26; 707/2; 707/3; 707/102; 709/201; 709/203; 709/204; 709/205; 709/206; 709/207; 709/223; 709/229

(58) Field of Classification Search .................. 707/102, 707/2, 3; 711/118; 702/186, 182; 703/21, 703/22, 13; 714/37; 715/735
See application file for complete search history.

(56) References Cited

U.S. PATENT DOCUMENTS

| | | | |
|---|---|---|---|
| 5,822,520 A * | 10/1998 | Parker | 709/230 |
| 5,835,755 A * | 11/1998 | Stellwagen, Jr. | 707/3 |
| 5,960,181 A * | 9/1999 | Sanadidi et al. | 703/21 |
| 6,108,309 A * | 8/2000 | Cohoe et al. | 370/241 |
| 6,223,171 B1 * | 4/2001 | Chaudhuri et al. | 707/2 |
| 6,269,330 B1 * | 7/2001 | Cidon et al. | 714/43 |
| 6,282,613 B1 * | 8/2001 | Hsu et al. | 711/118 |
| 6,367,033 B1 * | 4/2002 | Jibbe | 714/37 |
| 6,542,854 B2 * | 4/2003 | Yang et al. | 702/186 |
| 6,760,684 B1 * | 7/2004 | Yang et al. | 702/182 |
| 6,973,622 B1 * | 12/2005 | Rappaport et al. | 715/735 |
| 6,996,517 B1 * | 2/2006 | Papaefstathiou | 703/22 |
| 2002/0099521 A1 * | 7/2002 | Yang et al. | 702/186 |
| 2002/0103900 A1 * | 8/2002 | Cornelius et al. | 709/224 |
| 2003/0009696 A1 * | 1/2003 | Bunker V. et al. | 713/201 |
| 2006/0031787 A1 * | 2/2006 | Ananth et al. | 715/967 |
| 2006/0041415 A1 * | 2/2006 | Dybas et al. | 703/13 |
| 2006/0074970 A1 * | 4/2006 | Narayanan et al. | 707/102 |
| 2006/0155681 A1 * | 7/2006 | Chiang et al. | 707/3 |
| 2006/0161517 A1 * | 7/2006 | Bhattacharjee et al. | 707/2 |
| 2007/0078641 A1 * | 4/2007 | Bank et al. | 703/22 |
| 2007/0094393 A1 * | 4/2007 | Cochran et al. | 709/226 |

* cited by examiner

*Primary Examiner*—Kamini S Shah
*Assistant Examiner*—Cuong V Luu
(74) *Attorney, Agent, or Firm*—Yee & Associates, P.C.; Ingrid M. Foerster (57) ABSTRACT

A computer implemented method, apparatus, and computer usable program code to execute a set of instructions a selected number of times to simulate user loads for a selected number of users. A selected number of traces are obtained in response to executing the set of instructions the selected number of times. The selected number of traces are played back concurrently to simulate the workloads on the database.

10 Claims, 6 Drawing Sheets

The jcc trace file generated by the database contains SQL statements and other commands. For example:
[ibm][db2][jcc][Time:1129582148173][Thread:sib.LockThread][Connection@5dcba695] prepareStatement (UPDATE speedo1Node01.SIBOWNER SET INC_UUID=?, VERSION=?, MIGRATION_VERSION=? WHERE ME_UUID=?, 1003, 1007) called
[ibm][db2][jcc][Time:1129582148173][Thread:sib.LockThread][Connection@5dcba695] prepareStatement () returned PreparedStatement@54e666b9
[ibm][db2][jcc][Time:1129582148175][Thread:sib.LockThread][PreparedStatement@54e666b9] getFetchSize () returned 0
[ibm][db2][jcc][Time:1129582148175][Thread:sib.LockThread][PreparedStatement@54e666b9] setString (1, 4340a6d100057ba3f) called
[ibm][db2][jcc][Time:1129582148176][Thread:sib.LockThread][PreparedStatement@54e666b9] setInt (2, 1) called
[ibm][db2][jcc][Time:1129582148176][Thread:sib.LockThread][PreparedStatement@54e666b9] setInt (3, 0) called
[ibm][db2][jcc][Time:1129582148176][Thread:sib.LockThread][PreparedStatement@54e666b9] setString (4, 75AEC3DD53550C59) called
[ibm][db2][jcc][Time:1129582148176][Thread:sib.LockThread][PreparedStatement@54e666b9] executeUpdate () called

FIG. 9

```
Statement1.close();
ResultSet2 = Statement2.executeQuery("SELECT * FROM SPEEDO1NODE01.SIBOWNER");
Thread.sleep(1);
while ( ResultSet2.next() )
{
    result1_2 = ResultSet2.getString(1);
    result2_2 = ResultSet2.getString(2);
    result3_2 = ResultSet2.getInt(3);
    result4_2 = ResultSet2.getInt(4);
}
```

METHOD FOR A DATABASE WORKLOAD SIMULATOR

BACKGROUND OF THE INVENTION

1. Field of the Invention

The present invention relates generally to an improved data processing system and in particular to a computer implemented method and apparatus for testing a database. Still more particularly, the present invention relates to a computer implemented method, apparatus, and computer usable program code for simulating an environment with transactions to test a database.

2. Description of the Related Art

Software applications often interact with each other in a transactional manner. Some software applications request information, others supply information, and other software applications perform both functions while participating in such electronic transactions. Behind most electronic transactions are systems to store, retrieve, process, and manage information used in such transactions. Such systems are commonly known as databases. A database may be a simple organization of small amount of information, or may involve extremely large, complex, interrelated, and interdependent sets of information.

As the size and complexity of a database grows, the reliability and performance of the database become key issues. A database may perform reliably on a small scale, supporting a relatively small number of electronic transactions. Subjecting the database to a large volume of transactions, however, may cause the database to perform inadequately, unreliably, sluggishly, or breakdown altogether. The same may happen when the volume of transaction remains unchanged but the size of the information stored grows or when transactions require more intense processing to complete.

To test for and identify potential reliability and performance issues with a database, administrators and other users set up simulated environments in which they can subject a database to various levels of workloads. Such simulations are important in order to identify potential problem scenarios with respect to a subject database under testing. For example, a specific simulated environment might be set up to test if a database system will adequately support 10,000 Web transactions per minute requesting item descriptions of items in an online catalog, or if the database can simultaneously handle 200 users or applications connecting to it for a variety of processing intensive jobs.

Manufacturers of databases, administrators, users, and third party suppliers have created tools and techniques to test for potential reliability and performance problems with databases. Current simulation techniques have costs associated with them in terms of the amount of time, effort, and expense required to set up adequate simulations. The amount of human resources with the specialized skills required to obtain meaningful results from the simulation make these simulations cost prohibitive in many circumstances. In addition, concerns are present about the number and complexity of different components required to setup each simulation scenario.

Moreover, currently available tools and techniques rely upon compartmentalization of test scenarios, and mass-replication of smaller segments of each scenario. As a result, simulations resulting from such tools and techniques are sensitive to the narrow context of the segments of the specific scenario simulated.

For example, a simulation might be limited only to testing the load handling capabilities of the database when subjected to Web-transactions requesting item details of items in an online catalog. Such a simulation is reflective of the database's true performance because this type of simulation does not include the simultaneous activities of several other applications and users who may be connected to the database for completely unrelated transactions.

As a result, the simulation is not reflective of the database's true performance when only a few of the Web transactions are requesting item descriptions, and several others are either placing orders, making payments, or changing customer profiles. The simulation is sensitive only to the context of responding to a large number of item description requests over the Web. The simulation results are then meaningful only for that limited scenario.

Additionally, setting up even these context-sensitive, simulations requires complex software programming, or code development which in itself poses a host of obstacles that are commonly associated with any software development project. In summary, specialized skills, time to develop, test, and debug the code are required, only then the true object of the simulation can begin.

These types of limited scope simulations are often not sufficient in many situations. The cost and complexity of simulation testing increase exponentially because simply cloning sufficient numbers of limited-scope, context-sensitive, smaller simulations blindly is not practical. Also, this technique does not work because repeating the same transaction, for example, deleting a customer record, would not actually work after the first time the database processes the transaction and deletes the customer record. Relevant variation is needed in each of these numerous clone simulations to get meaningful results from the larger simulation.

Currently, this variation is accomplished through code specially written for this purpose, and is a very tedious and labor-intensive endeavor. Thus presently available tools and techniques address this problem of simulating database workloads using custom code, labor, and resource intensive test environments.

SUMMARY OF THE INVENTION

The present invention provides a computer implemented method, apparatus, and computer usable program code to execute a set of instructions a selected number of times to simulate user loads for a selected number of users. A selected number of traces are obtained in response to executing the set of instructions the selected number of times. The selected number of traces are played back concurrently to simulate the workloads on the database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
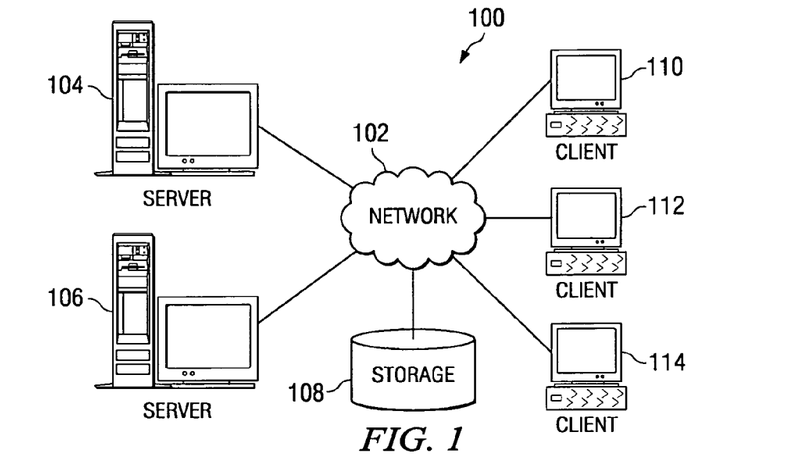
FIG. 1 is a pictorial representation of a network of data processing systems in accordance with an illustrative embodiment of the present invention.
Figure 2:
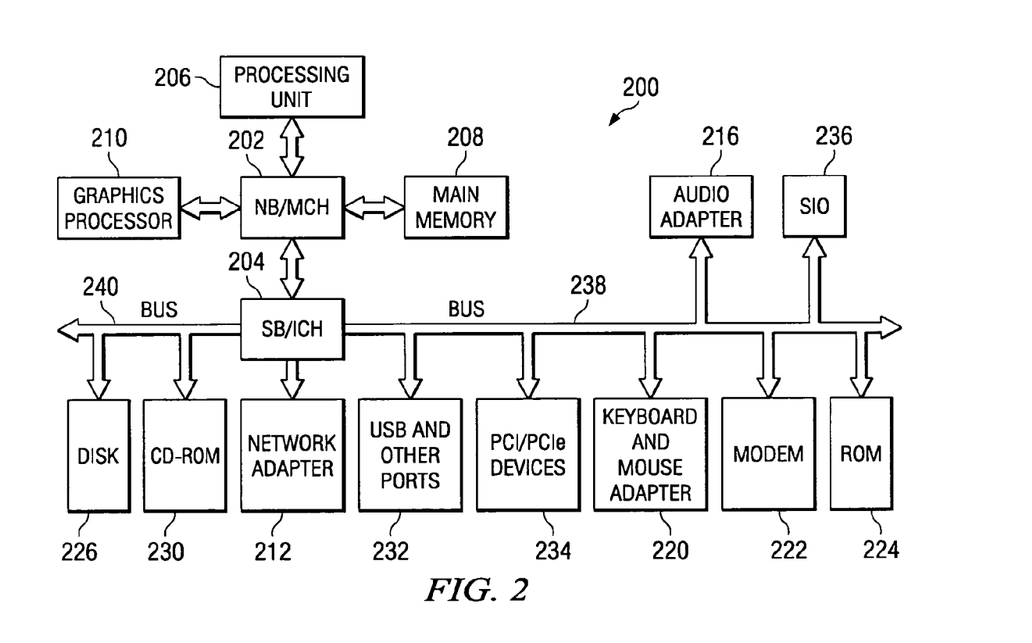
FIG. 2 is a block diagram of a data processing system is shown in accordance with an illustrative embodiment of the present invention.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eserver™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for a database workload simulation system. The aspects of the present invention simulate the database workload, which is normally driven by an expensive test configuration and test driver. In these illustrative examples, the workload simulator is context-free such that the test developer does not need to know anything about the characteristics of the workload. The aspects of the present invention do not require coding or script customization to any particular context.

Further, the simulator is designed to support direct database testing. The data is captured in the database management system (DBMS) application programming interface (API) level. Further, the aspects of the present invention do not require configuration and long term maintenance of middleware clusters.

Figure 3:
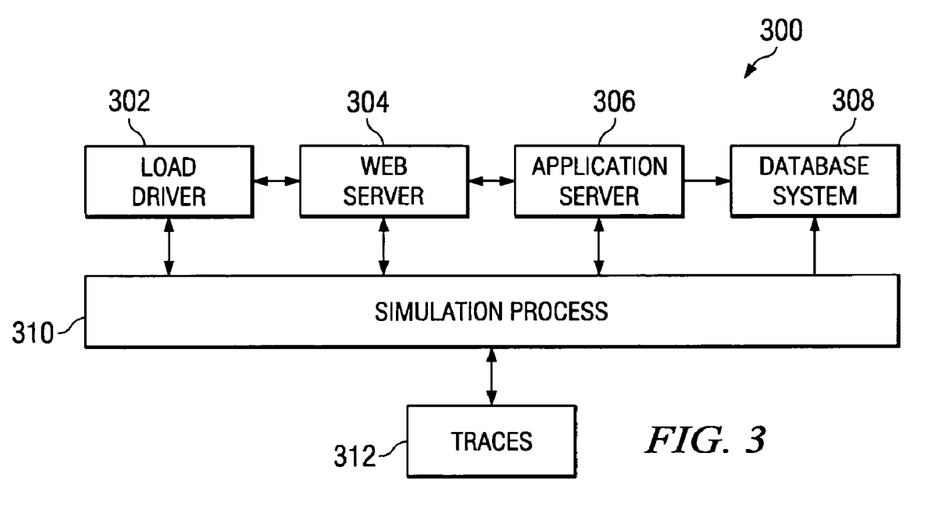
FIG. 3 is a diagram illustrating components used in simulating database workloads in accordance with an illustrative embodiment of the present invention.

Turning now to FIG. 3, a diagram illustrating components used in simulating database workloads is depicted in accordance with an illustrative embodiment of the present invention. In this example, the components illustrated form an example of a minimal test environment configuration. As illustrated, environment 300 contains load driver 302. This component generates input in environment 300 to simulate database traffic.

In these illustrative examples, environment 300 is configured for simulating database workloads based on a single client or requester. Of course, the simulation may be applied to more than one requestor depending on the particular implementation. In these examples, the number of clients is limited only by the number of clients load driver 302 may simulate. A client is entity that generates requests for a database and may be, for example, a computer or a processor on a computer.

Environment 300 also contains Web server 304, application server 306, and database system 308. Web server 304 and application server 306 form middleware in these examples. Web server 304 serves to handle traffic with users or requesters for the database. In these examples, Web server 304 is used to handle Internet Protocol (IP) and hypertext transfer protocol (HTTP) traffic. Application server 306 provides access to database system 308. Application server 306 may be implemented using various types of currently available programs, such as WebSphere™ Application Server, which is a product available from International Business Machines Corporation. In these examples, the use of only a single client in generating traffic requires only a single application server on a single node, such as application server 306. In these examples, the client is a simulated client, such as client 110 in FIG. 1. The normal operation, larger numbers of application servers on different nodes are employed, such as ten application servers.

Further, in an actual implementation of a database, additional Web servers on different data processing systems in addition to Web server 304 are required. Currently, two or more load drivers, such as load driver 302 are employed. As can be seen, by running the simulation process using a single client or requester, the number of components needed to set up the test environment is reduced. As a result, the cost in terms of time and hardware are reduced making this type of testing more feasible.

In simulating a request from a client, load driver 302 drives or sends traffic to Web server 304. This traffic is in the form of simulated requests from a client. Load driver 302 is a currently used component for simulating traffic in database workload simulations. In these examples, the simulation of traffic is only for a single user or client.

The different components, such as load driver 302, Web server 304, application server 306, and database system 308, are handled using simulation process 310. This process sends the appropriate commands to these different components to perform the workload simulation process. In the first phase, simulation process 310 sends commands to load driver 302 to generate traffic to Web server 304. This traffic contains different requests for database system 308.

Simulation process 310 also sends a command to database system 308 to initiate recording of a trace for the request generated in the simulation. When the simulation completes, this trace is stored within traces 312. Each trace within trace 312 represents actions or requests generated by a single client in these examples. Simulation process 310 repeats this cycle, or some series of steps for some desired number of users or clients. Each time a new simulation is run, load driver 302 generates a request in a manner that is different from the other simulations. These inputs are varied through currently used processes in load driver 302 to simulate requests to the database.

The recording of a trace by database system 308 is provided through a database management system (DBMS) application program interface (API) that is provided by most database managers. For example, DB2 Universal Database allows tracing of it's callable level interface (CLI). CLI is a standard database API that is provided for various currently available database systems. DB2 Universal Database is a product available from International Business Corporation.

After the desired number of traces have been collected, simulation process 310 plays back these traces to database system 308 to simulate traffic from multiple clients. For example, a hundred traces may be played back concurrently to simulate traffic from a hundred different clients accessing database system 308 in simulating workloads for this database.

In this manner, the increased effort in terms of time and hardware needed to simulate large amounts of database traffic is reduced through this process. This type of process does not require generating workload scripts to simulate multiple clients. Time needed to customize a script by understanding the transaction mix and different type of random functions is unnecessary using the aspects of the present invention. If a context-database workload simulator is used, the user typically records traffic in a run and studies the output to understand the pattern of the traffic. Thereafter, the user is required to define a transaction mix and boundary. The numerical data in the trace is replaced with a random function and the redundant transactions are removed. Thereafter, this trace is played back. These types of steps are unneeded using the aspects of the present invention. No changing or coding within the trace is required as opposed to using a context-database workload simulator.

Figure 4:
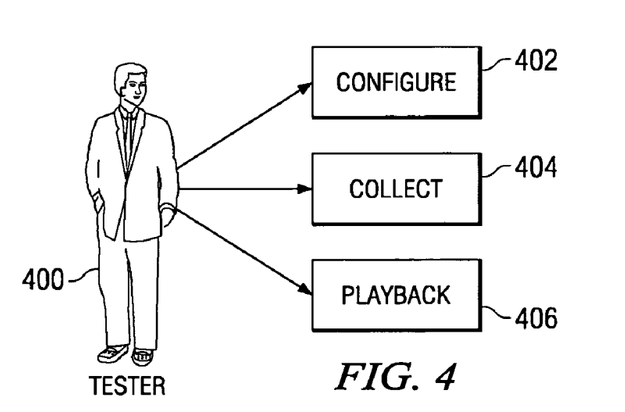
FIG. 4 is a case diagram for simulating database workloads in accordance with an illustrative embodiment of the present invention.

Turning now to FIG. 4, a case diagram for simulating database workloads is depicted in accordance with an illustrative embodiment of the present invention. In this example, tester 400 performs three basic tasks. The tasks are configure task 402, collect task 404, and playback task 406. Configure task 402 is a task used to configure a minimal test environment. For example, a DB2 Universal Database, which is a product available from International Business Machines Corporation, is used. This component along with a Web server, a Java messaging service (JMS) server, a application server, and a load driver are employed to form the test environment in this example.

Thereafter, collect task 404 is a set of instructions that is performed to collect N×M trace files from the configured test environment. Collect task 404 is nothing more than a task of kicking off a run, such as what a tester performs every day. In this example, the runs are used with a minimal test environment. As a result of collect task 404, database trace files are generated from the run. Collect task 404 runs the procedure M times in which each iteration of the run generates N trace files.

Thereafter, playback task 406 is used to play back Y trace files at the same time. In this process, the tester stresses the database management system with the concurrent playback of the trace files collected from collect task 404. In this example, Y is the number of users intended to simulate in any given test execution. In these examples, Y is smaller than or equal to M×N. The trace files are labeled and played back at the same time to simulate a number of database users. With this process, no trace file parsing, coding, or customization is required.

Figure 5:
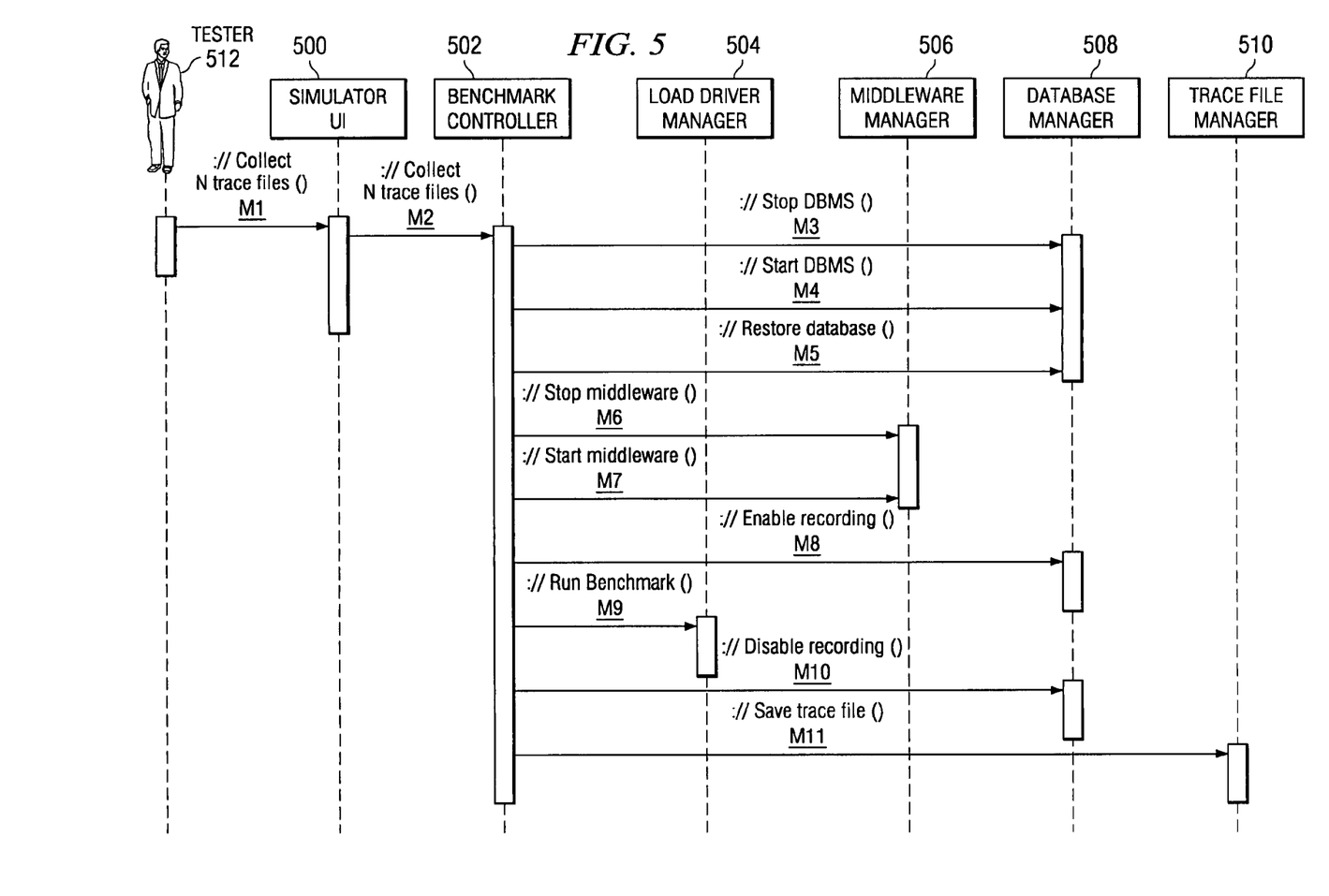
FIG. 5 is a diagram illustrating work flow in a database workload simulator in accordance with an illustrative embodiment of the present invention.

Turning next to FIG. 5, a diagram illustrating work flow in a database workload simulator is depicted in accordance with an illustrative embodiment of the present invention. As an example, one possible indication of trace file collection is depicted. The components present in this database workload simulator include simulator user interface (UI) 500, benchmark controller 502, load driver manager 504, middleware manager 506, database manager 508, and trace file manager 510. In this example, tester 512 is a user or software application that initiates collection of trace files that enter and collect in trace files command into simulator user interface 500 (message M1).

In this example, simulator user interface 500, benchmark controller 502, load driver manager 504, and middleware manager 506 are components found within simulation process 310 in FIG. 3.

Simulator user interface 500 is the user interface to receive requests to collect trace files. Benchmark controller 502 is a task coordinator in these illustrative examples. Load driver manager 504 serves as an encapsulation of a load driver. Middleware manager 506 manages middleware, such as a Web server, application server, and Java messaging service (JMS) server. Database manager 508 provides control for the database management system. Database manager 508 is a process found within the database that is being tested. This type of manager is used to send various commands to the database system. Trace file manager 510 is used to handle trace files generated by the runs.

Simulator user interface 500 forwards the collect trace files message to benchmark controller 502 (message M2). In turn, benchmark controller 502 starts by recycling the database management system from a backup image. This process occurs by benchmark controller 502 sending a stop command to database manager 508 (message M3). Thereafter, benchmark controller 502 sends a message to database manager 508 to start the database (message M4). Thereafter, benchmark controller 502 sends database manager 508 a restore database command (message M5).

Benchmark controller 502 also recycles the middleware. This recycling occurs with benchmark controller 502 sending middleware manager 506 a command to stop middleware (message M6). Thereafter, benchmark controller 502 sends middleware manager 506 a command to start the middleware again (message M7). This stopping and starting of the middleware ensures that the state information and cache data is cleared from the middleware between runs.

After the middleware software on the middleware has been started and before the test is kicked off, benchmark controller 502 sends an enable recording command to database manager 508 (message M8). This message is used to enable a database management system API to capture data. The run for the single user is then kicked off by benchmark controller 502 sending a run benchmark command to load driver manager 504 (message M9). Once the run has completed, benchmark controller 502 sends a disable recording command to database manager 508 to disable the database management system API used to collect data (message M10).

Then, benchmark controller 502 sends a save trace file command to trace file manager 510 (message M11). This particular message is used to save the trace file generated by the run in some sort of desirable or selected location for later use.

In these illustrative examples, the work flow depicted is repeated for a number of iterations required to achieve a desired number of trace files and simulated users. In these examples, each trace file may be a simulation of a different user performing different actions.

Figure 6:
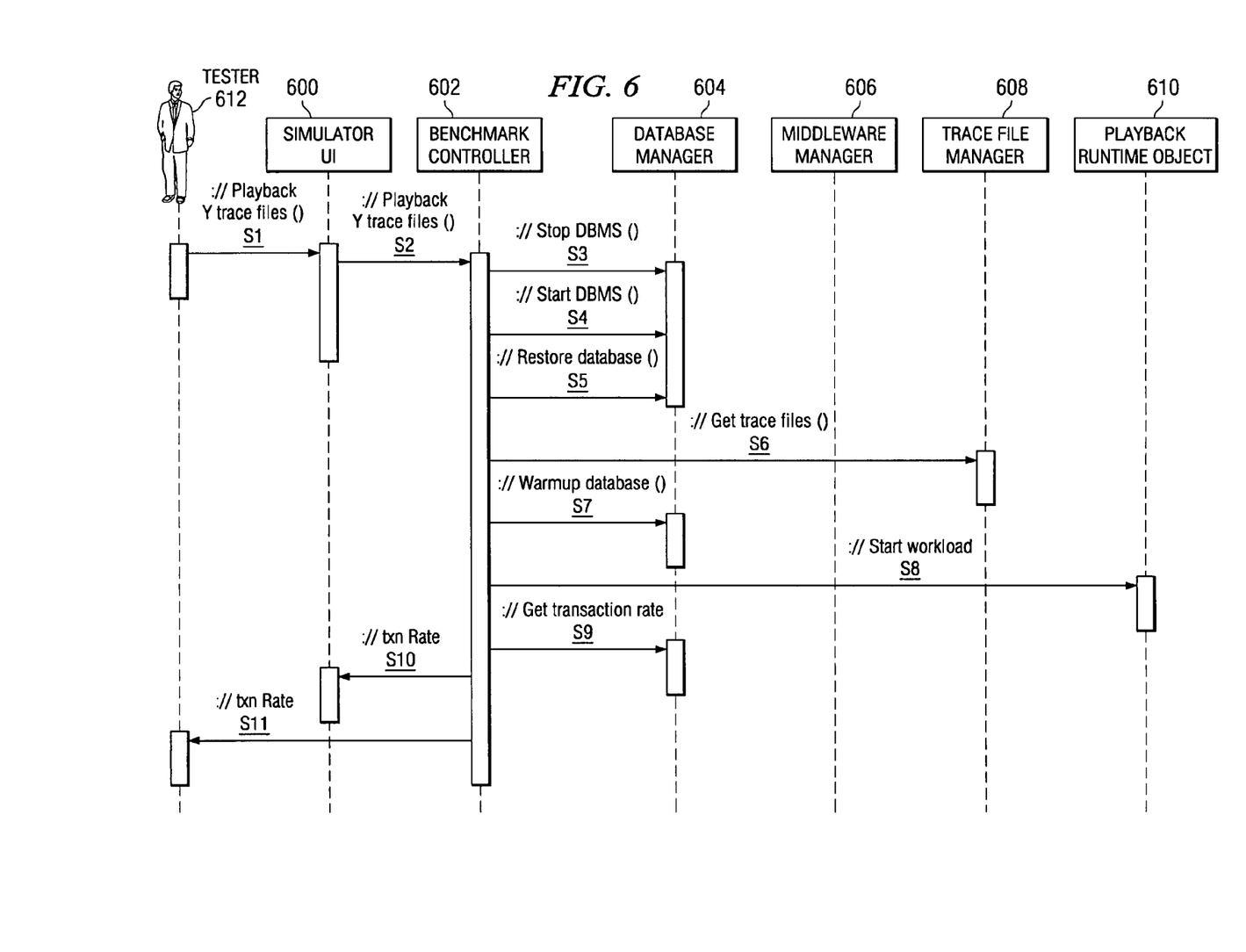
FIG. 6 is a diagram of playing back trace files in accordance with an illustrative embodiment of the present invention.

Turning now to FIG. 6, a diagram of playing back trace files is depicted in accordance with an illustrative embodiment of the present invention. In this example, the simulation system contains simulator user interface 600, benchmark controller 602, database manager 604, middleware manager 606, trace file manager 608, and playback runtime object 610. Simulator user interface 600, benchmark controller 602, database manager 604, middleware manager 606, and trace file manager 608 correspond to simulator user interface 500, benchmark controller 502, database manager 508, middleware manager 506, and trace file manager 510, in FIG. 5 respectively. The additional component used in this playback process is playback runtime object 610. This particular object is responsible for the interpretation of the captured traffic in the trace file and applying the workload to the system under test.

In this example, many database systems, such as DB2, include an ability to play back trace files. Playing back multiple trace files occurs by running multiple instances of the program used to play the trace file concurrently. If, however, the database system does not have the trace playback utility, playback runtime object 610 may be implemented as part of the simulation process. In this instance, a trace file interpreter and executor is employed. The trace file interpreter and executor is a process that interprets the data in the trace and generates the actions or requests that occurred when the trace was recorded.

In this particular playback process, middleware manager 606 does not perform any actions because the application server is no longer needed.

In this example, tester 612 is a user or application that initiates playback of trace files by interacting with simulator user interface 600. In this example, tester 612 sends a playback Y trace files command to simulator user interface 600 (message S1). This command is used to playback Y number of trace files. This command is relayed by simulator user interface 600 to benchmark controller 602 (message S2).

In response to receiving this command to playback trace files, benchmark controller 602 recycles the system under test and the database is restored. This process occurs with benchmark controller 602 sending a stop database command to database manager 604 (message S3). Thereafter, benchmark controller 602 sends a start database command to database manager 604 (message S4). Benchmark controller 602 then sends a restore database command to database manager 604 (message S5).

Next benchmark controller 602 sends a get trace files command to trace file manager 608 (message S6). This message is used by benchmark controller 602 to obtain the needed trace files for the simulation. For example, if a thousand database users are to be simulated, one thousand trace files are obtained from trace file manager 608 for the playback.

Prior to the playback of the trace files, the database is warmed up. This is accomplished by benchmark controller 602 sending a warm up database command to database manager 604 (message S7). The data should be loaded into the buffer pool before the benchmarking first starts in these examples. Message S7 is used to perform this process. This type of process is a common currently used practice with database benchmarking.

Then, benchmark controller 602 sends a start workload command to playback runtime object 610 (message S8). This command is used to concurrently playback the collected trace files for the database. After the trace files have been played, benchmark controller 602 sends a get transaction rate command to database manager 604 (message S9). This particular metric is a key metric in database performance.

Benchmark controller 602 returns this metric to simulator user interface 600 (message S10). In turn, simulator user interface 600 presents the transaction rate to tester 612 (message S11).

Figure 7:
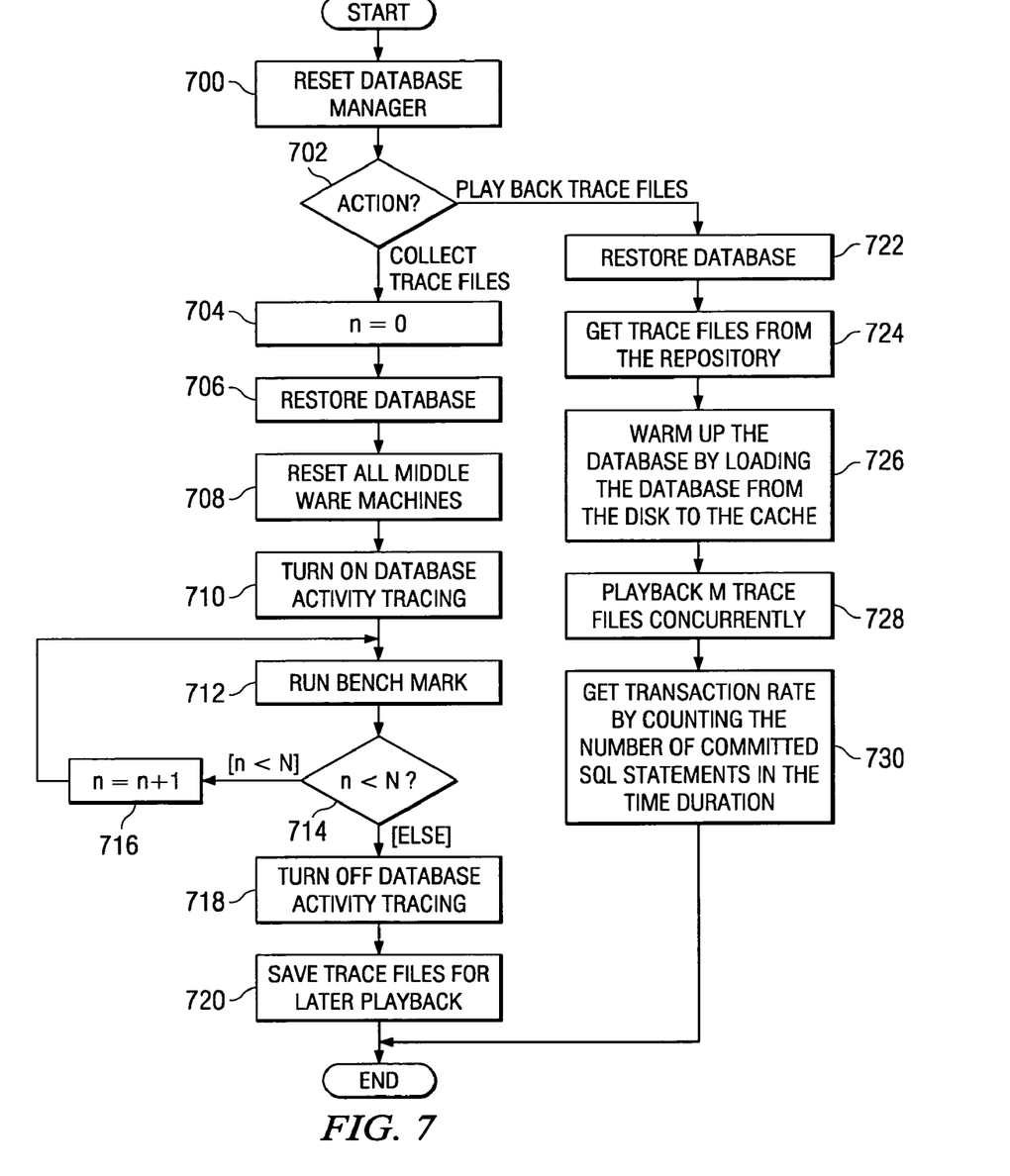
FIG. 7 is a flowchart of a process for a benchmark controller in accordance with an illustrative embodiment of the present invention.

Turning now to FIG. 7, a flowchart of a process for a benchmark controller is depicted in accordance with an illustrative embodiment of the present invention. In these examples, the process illustrated in FIG. 7 may be implemented in a benchmark controller, such as benchmark controller 502 in FIG. 5 or benchmark controller 602 in FIG. 6.

The process begins by resetting the database manager (step 700). A determination is then made as to what actions should be taken (step 702). If the action is to collect trace files, a counter n is set equal to zero (step 704). The counter n in step 704 is used to count the number of runs that have been made. The appropriate commands are sent to the database to restore the database to a prior state (step 706). With databases, one desirable prior state is the state right after the test database is populated with test data. Test data is normally generated by random functions. However, in testing, it is desirable to start every test with the same test data as a starting point in these illustrative examples. After populating the data, the database is usually backed up. Then, the database may be restored from the backup image to the prior state. The state is not restored between runs in the test in these examples.

Thereafter, the process resets all of the middleware data processing systems (step 708). This step is used to reset the different data processing systems on which middleware, such as a Web server or an application server, may run. Step 708 is implemented to clear out state information in cache data between different runs for simulating workloads by a client. Next, the process turns on database activity tracing (step 710). This process is used by sending an appropriate API command to the database manager. Part of this command may include a designation of where the trace files should be stored. With DB2 CLI, the command to record or create traces is "db2-v update cli cfg for section COMMON using Trace %1 and db2-v update cli cfg for section COMMON using TracePathName % CLI_TRACE_PATH %".

Then, the process runs the benchmark (step 712). This may be initiated by the benchmark controller running a script for batch file. Thereafter, a determination is made to whether the counter n is less than N (step 714). N is the number of different clients to be simulated. If the counter n is not less than N, n is incremented by one (step 716) with the process then returning to step 712 as described above. In these illustrative examples, the database is restored only upon the first time that it is run. Otherwise, the process turns off database activity tracing (step 718) and saves the trace files for later playback (step 720). The process terminates thereafter.

With reference again to step 702, if the action is to playback trace files, the process restores the database (step 722). Thereafter, trace files are obtained from a repository (step 724). The process then warms up the database by loading the database from the disk to the cache (step 726). Thereafter, M trace files are played back concurrently (step 728). M is the number of clients that should be simulated for the database in these examples. The number of trace files to be played back may be less then the number of trace files actually recorded. As a result, M may be less than N.

Playback for a database, such as DB2 CLI, is made through a playback utility provided with the database. In this example, the statements "start" db2cli.exe trace file 1 is used to run one instance of this program to play back trace file 1. This command is repeated for different trace file names at the same time to play back the trace files concurrently. The different instances may be started through a script or batch file that repeats the command for each trace file to be played back. Thereafter, the transaction rate is obtained by counting the number of committed sequential query language statements in the time duration (step 732) with the process terminating thereafter.

Figure 8:
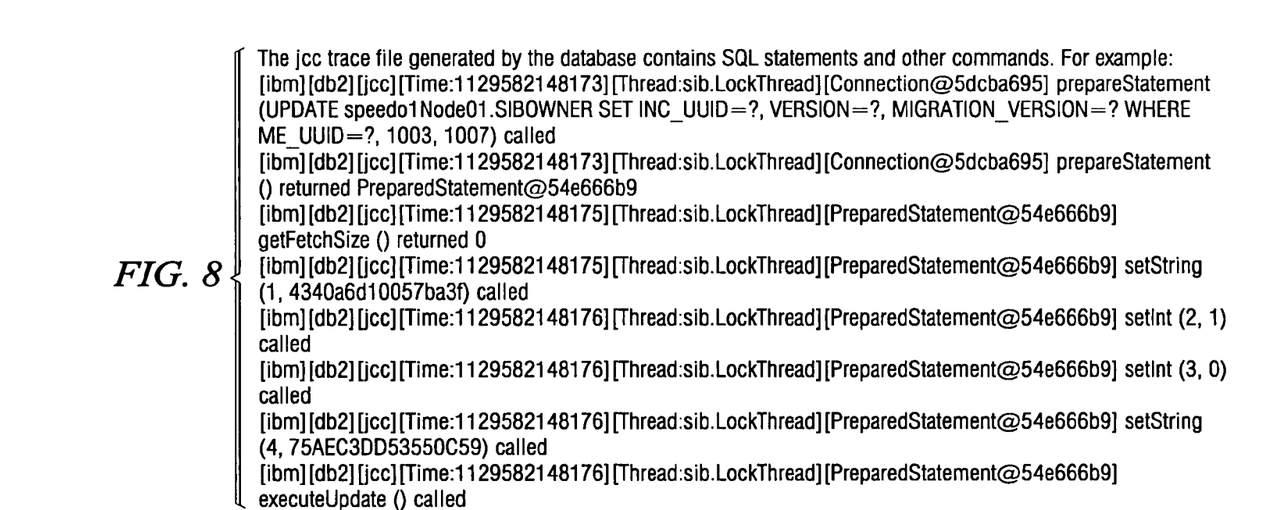
FIG. 8 is a diagram of a fragment of a trace file generated by database in accordance with an illustrative embodiment of the present invention.

Turning now to FIG. 8, a diagram of a trace file generated by a database is depicted in accordance with an illustrative embodiment of the present invention. In this example, trace 800 is an example of a portion of a Java common client (JCC) trace file generated by database in which SQL statements and other commands are present. Trace 800 is stored in traces 312 in FIG. 3 in these examples. This trace is played back to simulate the transactions generated by a single client in these examples.

If a particular type of trace is not supported by a playback utility, the aspects of the present invention may include a playback process to interpret the contents of the trace and execute the appropriate commands.

Figure 9:
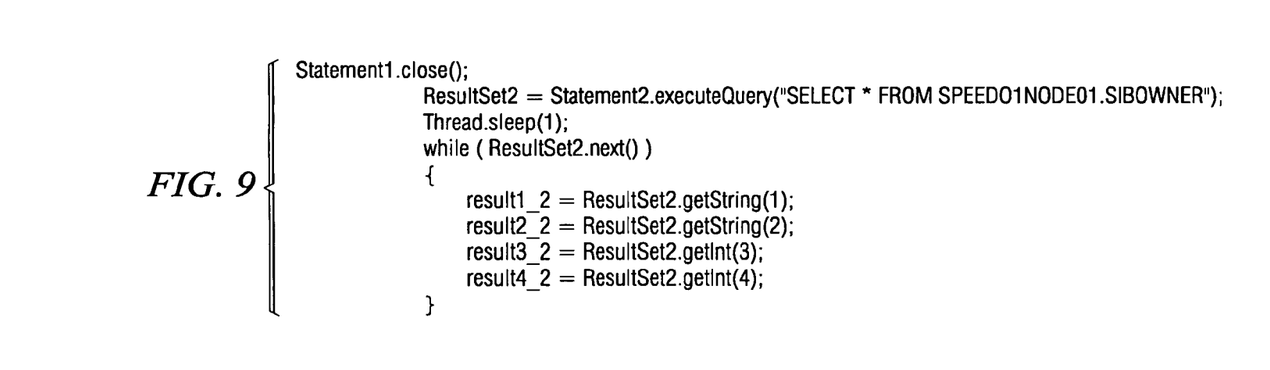
FIG. 9 is an example of a Java application that executes commands as interpreted in a Java common client trace in accordance with an illustrative embodiment of the present invention.

Turning now to FIG. 9, code 900 is an example of a java application that executes commands as interpreted in a DB2 Universal JDBC Driver, a.k.a. Java common client (JCC) trace. This type of process is unnecessary if the database system supports a playback of traces that it generates.

Thus, the aspects of the present invention provide a computer implemented method, apparatus, and computer usable program code for simulating database workloads. A minimal test environment is setup to allow for a single small number of clients to generate workload traffic on the database. The trace is collected for this run through the client. This run is repeated for however many clients are needed for the simulation. Each time a run is made, a trace is generated for the client. These traces are saved and then replayed concurrently to the database to simulate the workload from the desired number of clients. In the aspects of the present invention, file portion, coding, and customization is not required to simulate workloads on the database.

In this manner, the amount of time and hardware needed to test a database is reduced. In these examples, each run generating a trace is generated for a single client. Depending on the particular implementation, clients may be simulated in a trace. Adding additional clients, however, may increase the complexity of the testing and at some point require additional hardware and software resources. Thus, although additional clients may be simulated, such a change is optional depending on the increase and the complexity of the simulation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for simulating workloads on a database, the computer implemented method comprising:
   executing a set of instructions a first selected plurality of times to simulate workloads for each of a first selected plurality of clients to form a first plurality of simulations;
   storing a trace of each of the first plurality of simulations to form a stored first plurality of traces;
   obtaining a second selected plurality of traces from the stored first plurality of traces; and
   playing back the second selected plurality of traces concurrently to simulate the workloads of a second selected plurality of the clients on the database.

2. The computer implemented method of claim 1 further comprising:
   configuring the test environment.

3. The computer implemented method of claim 1 further comprising:
   receiving a set of metrics from the playing back of the second selected plurality of traces concurrently.

4. The computer implemented method of claim 3, wherein the set of metrics comprises a transaction rate.

5. The computer implemented method of claim 1 further comprising:
   stopping the database prior to each execution of the set of instructions;
   starting the database after the database is stopped prior to each execution of the set of instructions; and
   restoring the database to a prior state after the database is started prior to each execution of the set of instructions.

6. The computer implemented method of claim 5 further comprising:
   stopping middleware prior to each execution of the set of instructions; and
   starting the middleware after the middleware has been stopped prior to each execution of the set of instructions, wherein the state information and cached data is cleared from the middleware.

7. The computer implemented method of claim 1, wherein the storing step comprises:
   enabling recording of traces;
   receiving a trace from each execution of the set of instructions to form a first plurality of traces; and
   storing the first plurality of traces to form the stored first plurality of traces.

8. The computer implemented method of claim 1, wherein the executing step and the obtaining step are performed by a benchmark controller.

9. The computer implemented method of claim 1, wherein the second selected plurality of traces is less than the stored first selected plurality of traces.

10. The computer implemented method of claim 1, wherein the second selected plurality of traces is the same as the stored first selected plurality of traces.

* * * * *